United States Patent
Rossini et al.

(10) Patent No.: US 11,346,735 B2
(45) Date of Patent: May 31, 2022

(54) MONITORING SENSOR FOR A ROPE OF CABLEWAY SYSTEMS

(71) Applicant: REDAELLI TECNA S.P.A., Milan (IT)

(72) Inventors: Davide Rossini, Milan (IT); Giuliano Ambroset, San Quirino (IT)

(73) Assignee: Redaelli Tecna S.p.A., Milan (IT)

( * ) Notice: Subject to any disclaimer, the term of this patent is extended or adjusted under 35 U.S.C. 154(b) by 0 days.

(21) Appl. No.: 16/462,918

(22) PCT Filed: Dec. 23, 2016

(86) PCT No.: PCT/IT2016/000305
§ 371 (c)(1),
(2) Date: May 21, 2019

(87) PCT Pub. No.: WO2018/116327
PCT Pub. Date: Jun. 28, 2018

(65) Prior Publication Data
US 2019/0309470 A1    Oct. 10, 2019

(51) Int. Cl.
| | | |
|---|---|---|
| *D07B 1/14* | (2006.01) | |
| *G01L 5/10* | (2020.01) | |
| *G01L 5/04* | (2006.01) | |
| *G01L 5/101* | (2020.01) | |
| *G01M 5/00* | (2006.01) | |

(52) U.S. Cl.
CPC .............. *G01L 5/042* (2013.01); *D07B 1/145* (2013.01); *G01L 5/101* (2013.01); *G01M 5/0025* (2013.01); *G01M 5/0066* (2013.01)

(58) Field of Classification Search
CPC ....... B66B 7/1223; G01L 5/047; G01L 5/042; G01L 5/101; B61B 12/06
See application file for complete search history.

(56) References Cited

U.S. PATENT DOCUMENTS

| | | | | |
|---|---|---|---|---|
| 3,958,455 A * | 5/1976 | Russell | ...................... | G01L 1/22 73/862.68 |
| 4,461,459 A * | 7/1984 | Conti | ...................... | G01L 5/101 254/134.3 FT |
| 4,568,873 A * | 2/1986 | Oyanagi | ................... | G01B 7/14 324/627 |
| 4,598,168 A * | 7/1986 | Wagner | ..................... | H01B 7/10 174/111 |
| 4,979,125 A * | 12/1990 | Kwun | .................... | B65H 63/06 702/35 |
| 5,808,557 A * | 9/1998 | Berge | ...................... | G01D 21/02 340/679 |
| 6,534,999 B2 * | 3/2003 | Brown | .................... | H01B 7/328 324/543 |
| RE40,166 E * | 3/2008 | Sukhorukov | .......... | G01N 27/82 324/235 |

(Continued)

FOREIGN PATENT DOCUMENTS

CA        2917368 A1 *    7/2017    ............... B66C 1/00

*Primary Examiner* — Tran M. Tran
(74) *Attorney, Agent, or Firm* — R. Ruschena Patent Agent, LLC

(57) ABSTRACT

Sensor (1) for monitoring the parameters of rotation around its own axis and vibration of a steel rope (100), comprising a battery (2), indicator means (3) of the state of charge of said battery (2), at least a LED indicator (5), a power unit (7) which supplies the sensor (1), a detection unit (8) of the rotation angles ($\phi$, $\gamma$) around its own axis (X) and of the vibrations of said steel rope (100), a microprocessor (9) for collection activity and data transmission, said sensor (1) being housed in a portion obtained in the core (110) of the steel rope (100).

11 Claims, 3 Drawing Sheets

(56) References Cited

U.S. PATENT DOCUMENTS

| | | | | |
|---|---|---|---|---|
| 7,441,464 B2 * | 10/2008 | Turnbull | G01L 1/122 | 73/146 |
| 7,516,605 B2 * | 4/2009 | Goldwater | D02G 3/441 | 57/238 |
| 7,621,853 B2 * | 11/2009 | LaTour | A63B 5/20 | 482/81 |
| 7,752,830 B2 * | 7/2010 | Goldwater | D07B 1/145 | 57/238 |
| 7,856,339 B2 * | 12/2010 | Vock | A43B 3/00 | 702/173 |
| 8,111,163 B2 * | 2/2012 | Utaka | H01B 7/368 | 235/375 |
| 8,130,101 B2 * | 3/2012 | Pellen | H01B 7/324 | 340/568.2 |
| 8,342,901 B1 * | 1/2013 | Deluz | A63B 19/00 | 446/175 |
| 8,912,889 B2 * | 12/2014 | Sarchi | B66C 13/12 | 340/10.1 |
| 8,970,208 B2 * | 3/2015 | Fulkerson | G01L 3/109 | 324/207.25 |
| 9,400,221 B2 * | 7/2016 | Sarchi | G01M 5/0025 | |
| 9,593,990 B2 * | 3/2017 | Duan | G01L 5/10 | |
| 9,862,571 B2 * | 1/2018 | Sun | G01R 17/00 | |
| 9,944,494 B2 * | 4/2018 | Alasentie | D07B 1/025 | |
| 10,155,569 B2 * | 12/2018 | Kyrre | B63B 21/20 | |
| 10,352,683 B2 * | 7/2019 | Ouellette | G01N 27/90 | |
| 10,407,280 B2 * | 9/2019 | Hillgardner | B66C 13/105 | |
| 10,473,806 B2 * | 11/2019 | Lambert | G01V 1/3843 | |
| 10,612,947 B2 * | 4/2020 | Kishida | G01D 5/268 | |
| 10,778,285 B2 * | 9/2020 | Yates | H01B 7/32 | |
| 2015/0197408 A1 * | 7/2015 | St. Germain | G01M 5/0033 | 340/668 |
| 2016/0041127 A1 * | 2/2016 | King | G01L 5/042 | 73/581 |

* cited by examiner

MONITORING SENSOR FOR A ROPE OF CABLEWAY SYSTEMS

BACKGROUND OF THE INVENTION

1. Field of the Invention

The present invention relates to a sensor for monitoring a steel rope, in particular in cableway systems. Said sensor is also provided with hardware and software suitably developed for detecting and quantifying the rotations of a rope around its own axis and the vibrations developing during the normal functioning of the same rope.

2. Brief Description of the Prior Art

At the state of the art there are not known sensors for monitoring ropes for cableway systems, in particular able to measure the rotation around their own axis and the vibrations developing during the normal functioning of the same rope. Such monitoring is naturally needed to guarantee the greatest safety on such systems.

Therefore, a novel system is needed which allows to monitor such parameters continuously and exactly along the whole rope during the normal functioning on a system.

SUMMARY OF THE INVENTION

Therefore, the object of the present invention is a sensor for monitoring a steel rope in cableway systems, in particular for measuring the parameters of rotation and vibration developing during the normal functioning of a rope. In particular, the sensor is studied for measuring the rotations of a rope around its own axis X, having rotation angles φ and Y (in the two rotation directions around its own axis, respectively) as shown in FIGS. 1 and 4. Typically during the functioning of the rope on a system, no rope rotations around its own axis should occur since the geometry of the same rope would be modified, thus altering its performance. But, for various reasons it occurs that the system induces forced rotations to the rope. Therefore, a first aim of such device is to quantify the number of rotations of the rope and to individuate them along the system. Moreover, the sensor is able to measure the vibrations of a rope, induced by the passage of the same rope on the roller conveyor of the system. Due to the geometry of the rope, each time the rope passes on the roller conveyors 200 of a system, vibrations are generated whose intensity depends on various factors comprising the geometrical parameters of the same rope (for example the pitch), as shown in FIG. 2. So, another aim of this sensor is to measure the intensity of these vibrations on the various roller conveyors, in the various points of the system.

Therefore, object of the present invention is a sensor for measuring and calculating the parameters of rotation and vibration of a rope, as specified in the appended independent claim.

The dependent claims describe particulars and further advantageous aspects of the invention.

BRIEF DESCRIPTION OF THE DRAWINGS

These and other advantages of the invention will be described in detail in the following, with reference to the appended drawings, in which.

DETAILED DESCRIPTION OF THE PREFERRED EMBODIMENTS

Figure 3:
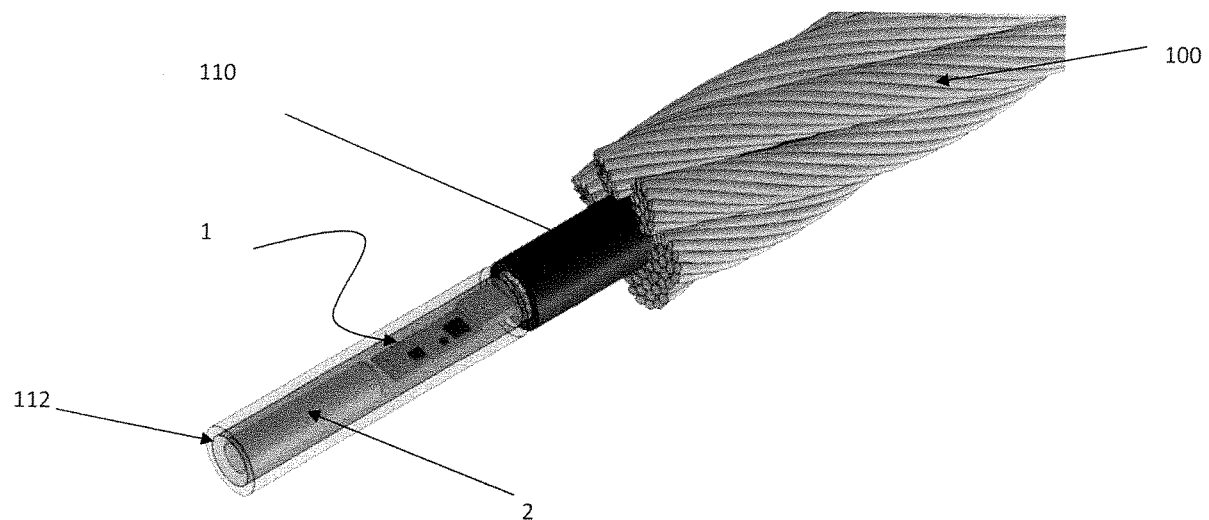
FIG. 3 shows a tridimensional view of the inside of a rope in which the sensor, object of the present invention, is applied.
Figure 4:
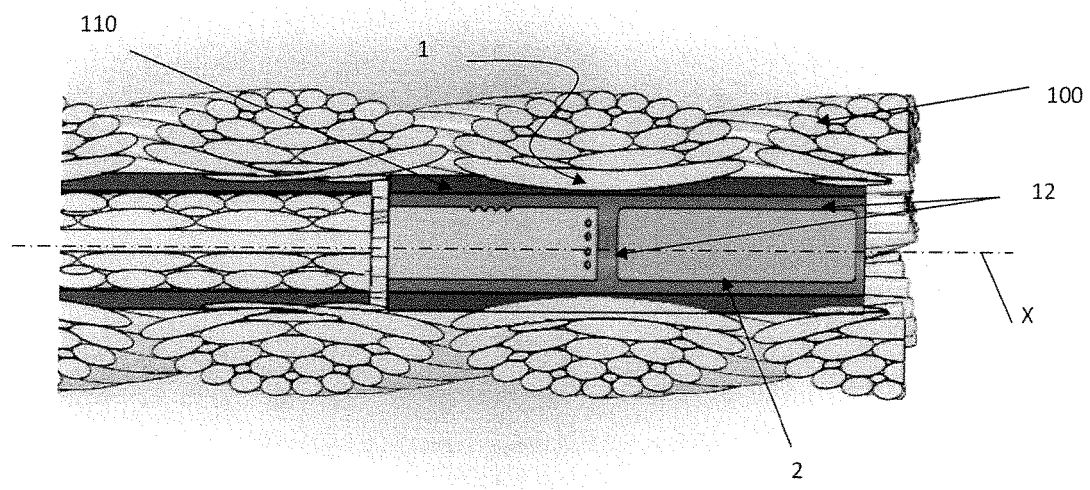
FIG. 4 shows a longitudinal section of a rope in which the device, object of the present invention, is applied.
Figure 5:
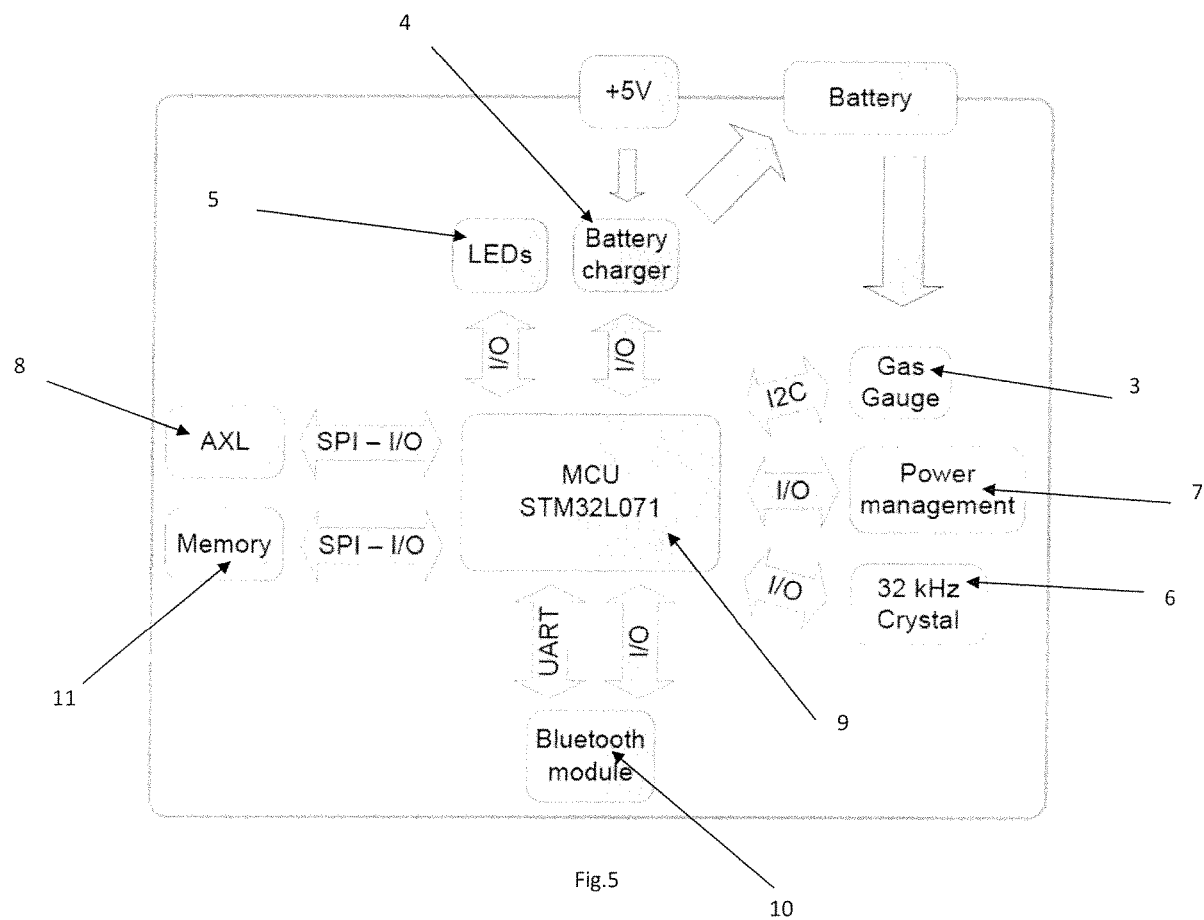
FIG. 5 shows a block diagram of the elements of the sensor, object of the present invention.

As it is shown in FIGS. 3 to 5, object of the present invention is a sensor 1 for monitoring the parameters of rotation and vibration of a steel rope 100, comprising:

- a 3.7 V battery 2;
- indicator means 3 of the state of charge of the battery "Gas Gauge";
- at least a LED indicator 5; integrated in the sensor for diagnostic aim;
- an oscillator means, i.e. a 32 kHz oscillator crystal 6 which provides the microprocessor (MCU) with the "timestamp", with a better precision than the inner clock of the same microprocessor;
- a voltage control unit 7 which provides a 2.8 V stabilized supply from the battery 2 with a very high efficiency; the sensor is supplied with a 3.7 V voltage;
- an accelerometer (AXL) 8 which is the detecting unit integrated in the sensor. It is provided with a full scale adjustable up to 16 g and a very low consumption power (about 10 µA at 10 Hz);
- a microprocessor 9 (MCU) with very low power integrated on the sensor for collection activity and data transmission;
- a Bluetooth interface (BT) 10 with low energy consumption;
- a flash memory 11 outside the microprocessor, able to substitute the flash memory incorporated in the microprocessor 9, in case the latter is not sufficient.

The battery of the sensor can be recharged as required by an outer battery charger 4, connected to an outer feeder as well (+5V) which recharges the battery 2.

Figure 1:
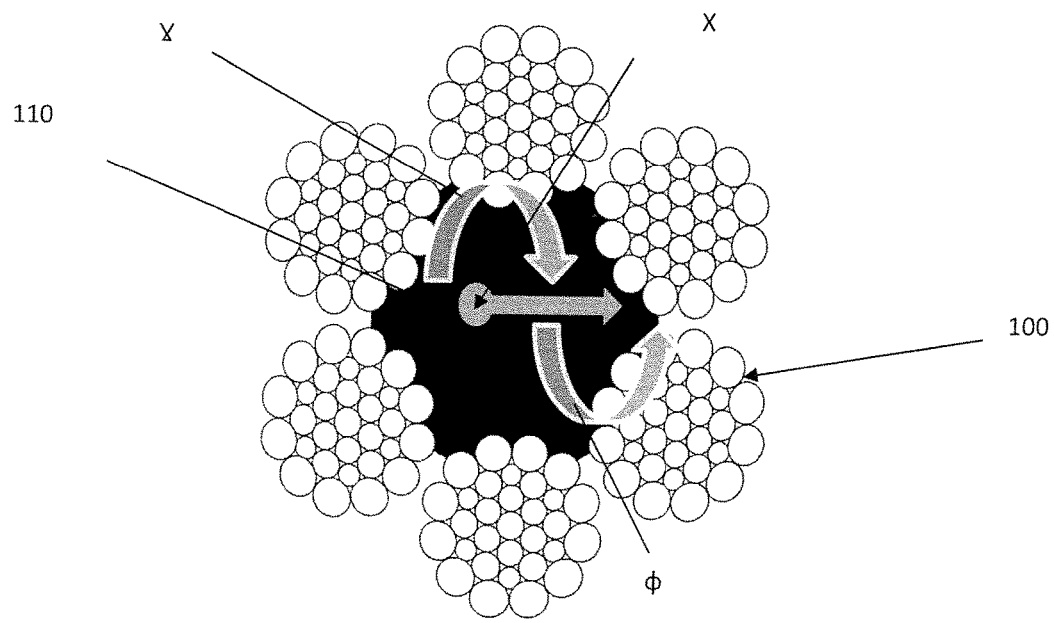
FIG. 1 shows a cross section of a rope for measuring the rotation around its own axis, according to the invention.
Figure 2:
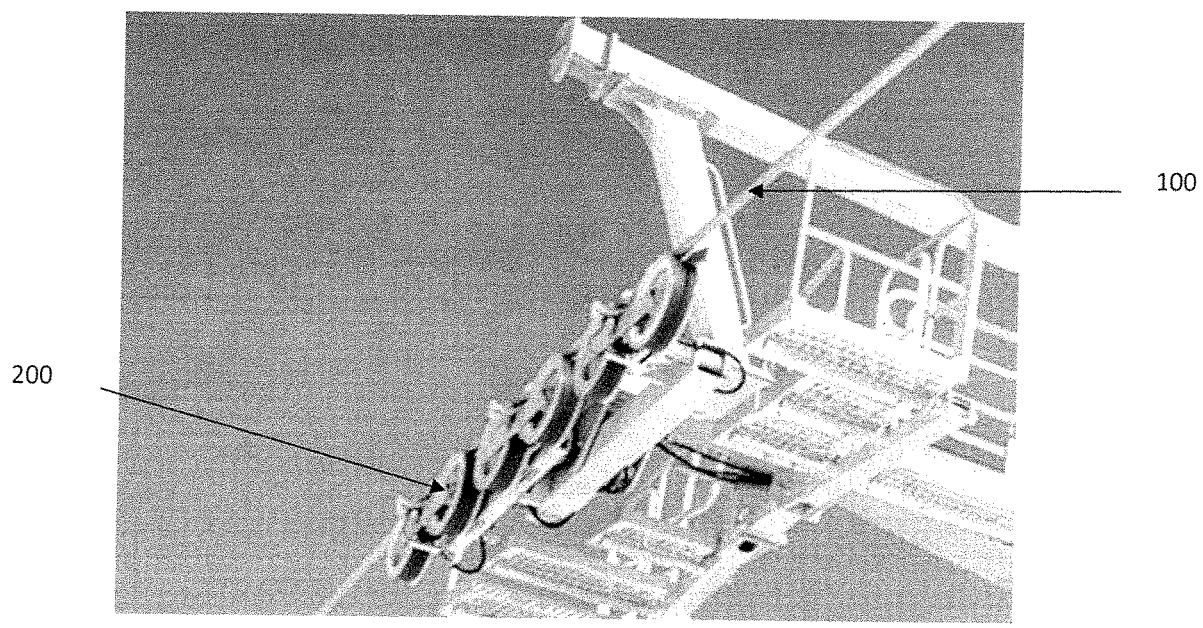
FIG. 2 shows a rope mounted on a system during the passage of the same on the roller conveyors of the system, according to the invention.

Said sensor 1 and said battery 2 are positioned inside the rope 100, in a portion obtained in the core 110 of the rope, i.e. in the innermost portion of the same rope (FIGS. 3, 4). In this way, the sensor 1 can measure the quantities concerning the rotation of the rope around its own axis and the vibrations along the whole path of the system. Specifically, the sensor 1 uses an accelerometer 8 which measures the accelerations on the three axes x-y-z of the rope 100. With these measurements, by means of suitable mathematical formulas, it is possible to quantify the rotations of the rope around its own axis and the intensity of the vibrations of the rope when passing on the roller conveyors 200 of FIG. 2. In particular, the estimation of the longitudinal rotation is based on the roll and pitch angles by means of the acceleration measures. The data acquired are processed by the microprocessor 9 and stored in the memory unit provided in the system.

To protect the sensor and the battery from the compression mechanical stresses to which they are subject to, caused by the rope pulling, they are both drowned in a protective material 12, for example resin, as shown in FIG. 4. In the following, they are positioned in a cylinder 112 of not metal material resistant to compression (for example Nylon, as shown in FIG. 3). The cylinder 112 has equal length to the dimensions of the sensor 1 and battery 2, and a thickness variable according to the diameter of the rope 100 where the sensor 1 is positioned. It is possible to introduce the sensor 1 inside the rope 100 both during the production step of the same rope 1, and during the installation and/or cut to measure step. Specifically, FIGS. 3 and 4 show the introduction of the sensor in the installation step of the rope, during the splice operation (the rope closed as a ring). In this case, the sensor 1 is positioned at the end of the tail.

The data collected by the sensor 1 during the normal functioning of the rope along the system are communicated by Bluetooth LE4 to a smartphone by means of an application developed therefor. The application allows to:
- connect/disconnect to the sensor/sensors provided inside the rope;
- send the data registration start command to the sensor, by selecting any registration frequency;
- send the data registration stop command to the sensor;
- download the data collected by the sensor;
- send the data collected by the sensor to the PC;
- delete the data present in the memory of the sensor;
- request the dimension of the free and used memory to the sensor;
- request the charge state of the battery to the sensor.

The smartphone communicates with a personal computer positioned in one of the stations of the system. Finally, by means of a software specifically developed therefor the personal computer collects, processes and shows the data collected by the sensor, and provides the user with:
- number, direction and quantity of the rotations along the system;
- intensity of the vibrations on each roller conveyor of the system.

Besides the embodiments of the invention, as above described, it is to be intended that there exist many other variants. Further, it is to be intended that said embodiments are only example and do not limit in any way the invention and its possible application or configurations. On the contrary, even if the above description allows the experts in the field to implement the present invention at least according to one example embodiment, it is to be intended that many variants of the elements described can be made without departing from the object of the invention, encompassed by the appended claims, literally interpreted and/or according to their legal equivalents.

The invention claimed is:

1. A sensor (1) for continuously monitoring parameters of rotation around a cableway steel rope axis (X) and vibrations of a cableway steel rope (100), comprising:
a 3.7V battery (2) which is rechargeable by an outer battery charger (4) connected to an outer feeder supplying 5 volts to said battery charger (4);
indicator means (3) of state of charge of said 3.7V battery, at least a LED indicator (5), for diagnostic aim, integrated in the sensor (1),
a power unit (7) which supplies 2.8 V stabilized voltage from the 3.7 V battery (2);
a detection unit (8) which detects, quantifies and locates a number of rotation around said cableway steel rope axis (X), rotation angles (roll angle φ, pitch angle γ), and rotation direction of the cableway steel rope (100) around said cableway steel rope axis (X),
and wherein said detection unit (8) measures a vibration intensity of said cableway steel rope (100), said vibration intensity is measured whenever said sensor (1) passes on a roller conveyor (200) of a cableway;
a microprocessor (9) for collection activity and data transmission, said microprocessor (9) being integrated on the sensor (1) and housed in a portion obtained in a core (110) of the cableway steel rope (100).

2. The sensor (1) according to claim 1, further comprising an oscillator means (6) in the form of a 32 Khz oscillator crystal which provides a timestamp having a greater precision than a one provided by an inner clock function of the microprocessor.

3. The sensor (1) according to claim 1, further comprising a flash memory (11) outside the microprocessor (9), able to substitute the flash memory incorporated in the microprocessor (9) in case the flash memory incorporated in the microprocessor (9) is not sufficient, said flash memory (11) stores data acquired by said microprocessor (9).

4. The sensor (1) according to claim 1, further comprising a wireless transfer interface protocol (10) with low energy consumption, allowing the connect/disconnect of a sensor (1) mounted inside the cableway steel rope (100); said interface allows:
sending data registration start command to the sensor, by selecting any registration frequency;
sending data registration stop command to the sensor (1); —downloading the data collected by the sensor (1);
sending data collected by the sensor to a Personal Computer (PC); —deleting data present inside the flash memory (11) of the sensor (1);
requesting size of free and used flash memory (11); —requesting a charge state of the battery (2) of the sensor (1);
and wherein said personal computer provides a user with:
number, direction and quantity of the cableway steel rope (100) rotations;
intensity of the vibrations on each roller conveyor (2000-) of the cableway;
and wherein said wireless transfer interface protocol (10) communicates data collected by sensor (1) to a smartphone.

5. The sensor (1) according to claim 1, wherein said detection unit (8) measures accelerations on three axes x-y-z of the cableway steel rope (100); and wherein said accelerations measurements allow a computation of a longitudinal rotation based on a roll and pitch angles by means of acceleration measures.

6. The sensor (1) according to claim 1, wherein said sensor (1) is supplied by the power unit (7) with a voltage equal to 3.7 V from the battery (2).

7. The sensor (1) according to claim 1, wherein said sensor (1) and said battery (2) are imbedded inside a protective material (12) and positioned inside a cylinder (112) of non-metal material resistant to compression, said cylinder (112) is positioned inside the rope 100 in the innermost portion of the same.

8. The sensor (1) according to claim 7, wherein said cylinder (112) has equal length to dimensions of the sensor (1) and battery (2), and a thickness variable according to diameter of the rope (100) where it is positioned.

9. The sensor (1) according to claim 7, wherein said protective material (12) is made of resin.

10. The sensor (1) according to claim 7, wherein said protective material (12) is made of nylon.

11. The sensor (1) according to claim 1, wherein said detection unit (8) is using an accelerometer (AXL), said accelerometer is provided with a full scale adjustable to 16 g to measure accelerations on three axes of a rotation of the rope (100);
and wherein said accelerometer is using 10 μA at 10 Kz.

* * * * *